United States Patent [19]

Kolosowski

[11] Patent Number: 5,585,058
[45] Date of Patent: *Dec. 17, 1996

[54] METHOD FOR PROVIDING ACCELERATED RELEASE OF A BLOWING AGENT FROM A PLASTIC FOAM

[75] Inventor: Paul A. Kolosowski, Dublin, Ohio

[73] Assignee: The Dow Chemical Company, Midland, Mich.

[*] Notice: The portion of the term of this patent subsequent to Dec. 1, 2013, has been disclaimed.

[21] Appl. No.: 428,597

[22] Filed: Apr. 25, 1995

Related U.S. Application Data

[63] Continuation-in-part of Ser. No. 161,179, Dec. 1, 1993, Pat. No. 5,424,016, which is a continuation of Ser. No. 960,049, Oct. 13, 1992, abandoned, which is a division of Ser. No. 693,835, Apr. 30, 1991, abandoned.

[51] Int. Cl.⁶ .............................. B29C 44/00; B26F 1/24
[52] U.S. Cl. .............................. 264/156; 264/51; 264/52; 264/DIG. 5; 264/DIG. 13; 264/DIG. 15; 425/4 C; 425/290; 425/817 C
[58] Field of Search ............................ 264/51, 52, 53, 264/54, 153, 154, 155, 156, 41, DIG. 13, DIG. 15; 425/4 C, 4 R, 817 C, 817 R, 290

[56] References Cited

U.S. PATENT DOCUMENTS

| | | | |
|---|---|---|---|
| 3,396,616 | 8/1968 | Wright | 83/16 |
| 3,573,152 | 3/1971 | Wiley et al. | 264/54 |
| 3,682,739 | 8/1972 | Tesch et al. | 264/156 |
| 3,817,671 | 6/1974 | Lemelson | 425/66 |
| 3,966,526 | 6/1976 | Doerfling | 156/224 |
| 4,183,984 | 1/1980 | Browers et al. | 428/81 |
| 4,199,639 | 4/1980 | Ronc | 428/138 |
| 4,201,818 | 5/1980 | Rohn | 428/159 |
| 4,368,276 | 1/1983 | Park | 264/53 |
| 4,395,510 | 7/1983 | Park | 524/230 |
| 4,485,193 | 11/1984 | Rubens et al. | 264/53 |
| 4,663,361 | 5/1987 | Park | 264/DIG. 5 |
| 4,824,720 | 4/1989 | Malone | 428/294 |
| 4,931,484 | 6/1990 | Hovis et al. | 521/143 |
| 5,059,376 | 10/1991 | Pontiff et al. | 264/DIG. 15 |
| 5,059,631 | 10/1991 | Hovis et al. | 264/52 |
| 5,066,531 | 11/1991 | Legg et al. | 264/154 |
| 5,124,097 | 6/1992 | Malone | 264/51 |
| 5,225,451 | 7/1993 | Rogers et al. | 521/94 |
| 5,411,689 | 5/1995 | Lee et al. | 264/DIG. 15 |
| 5,424,016 | 6/1995 | Kolosowski | 264/156 |

FOREIGN PATENT DOCUMENTS

| | | |
|---|---|---|
| 602262A1 | 7/1994 | European Pat. Off. . |
| 46-25639 | 7/1971 | Japan ............ 264/156 |
| 2102808 | 2/1993 | United Kingdom . |
| 9219439 | 11/1992 | WIPO . |

*Primary Examiner*—Jay H. Woo
*Assistant Examiner*—Duane S. Smith
*Attorney, Agent, or Firm*—J. Robert Dean, Jr.

[57] ABSTRACT

Disclosed is a method for providing accelerated release of a blowing agent from a solid, non-perforated plastic foam. The method relates (a) providing the solid, non-perforated plastic foam having the blowing agent and a permeability modifier therein and (b) perforating the foam at its surface to form a multiplicity of channels extending from the surface into the foam. The channels are in gaseous communication with the environment outside the foam and provide accelerated release of blowing agent.

65 Claims, 2 Drawing Sheets

← EXTRUSION DIRECTION

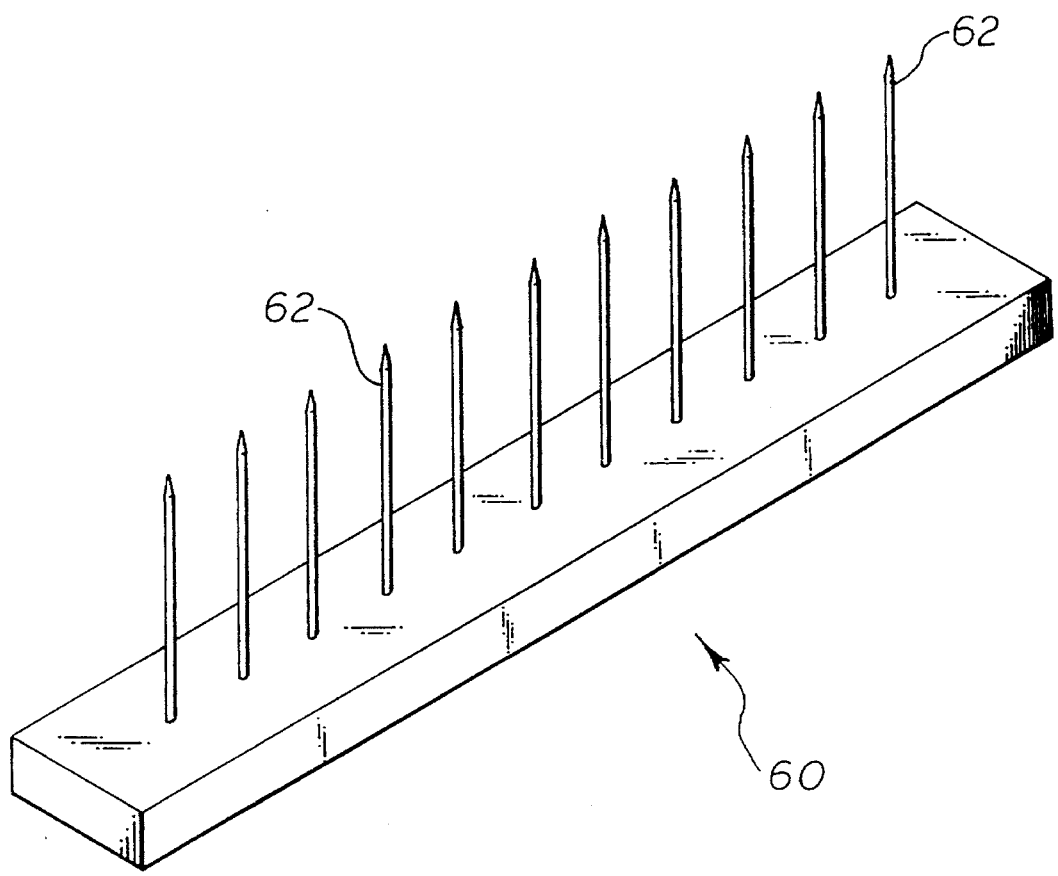

5,585,058

METHOD FOR PROVIDING ACCELERATED RELEASE OF A BLOWING AGENT FROM A PLASTIC FOAM

CROSS-REFERENCE TO RELATED APPLICATION

This application is a continuation-in-part of U.S. Ser. No. 08/161,179, filed Dec. 1, 1993 and issued as U.S. Pat. No. 5,424,016 on Jun. 13, 1995, which is a continuation of U.S. Ser. No. 07/960,049, filed Oct. 13, 1992, abandoned, which is a divisional of U.S. Ser. No. 07/693,835, filed Apr. 30, 1991, abandoned.

BACKGROUND OF INVENTION

Concern over ozone depletion in the atmosphere has prompted calls for the replacement of chlorofluorocarbon foam blowing agents with blowing agents offering substantially reduced ozone depletion potential such as hydrocarbons.

Hydrocarbons and some other alternative blowing agents present their own unique problems. Chief among these is greater fire hazard in closed-cell foams due to entrapped blowing agent. Other problems however, may include toxicity or environmental incompatibility. The flame retardancy or environmental incompatibility of closed-cell foams may be slow to recover due to the relatively slow permeation of some blowing agents, including hydrocarbons, from the foams.

To address the problem of flame retardancy, it would be desirable to have a closed-cell foam structure which more quickly releases blowing agents, particularly flammable blowing agents. Also desirable would be a process for making such a foam structure.

SUMMARY OF THE INVENTION

According to the present invention, there is a closed-cell plastic foam structure comprising a plastic foam defining a multiplicity of channels extending from the surface of the foam into and preferably through the foam. The channels are free of direction with respect to the longitudinal extension of the foam. The channels are in gaseous communication with the environment outside of the foam structure, and provide enhanced release of blowing agent from the foam structure. The foam structure is useful in cushion packaging applications.

Further according to the present invention, there is a process for making a plastic foam structure comprising (a) providing the plastic foam and (b) perforating the foam at its surface to form a multiplicity of channels extending from the surface into and preferably through the foam to form the foam structure. The channels are free of direction with respect to the longitudinal extension of the foam and in gaseous communication with the environment outside of the foam structure.

BRIEF DESCRIPTION OF THE DRAWING

The novel features of the present invention and the context within which they are set will be better understood upon reviewing the following specification together with the drawings.

FIG. 3 shows a typical structure for perforating the plastic foam according to the present invention.

DETAILED DESCRIPTION

Figure 1:
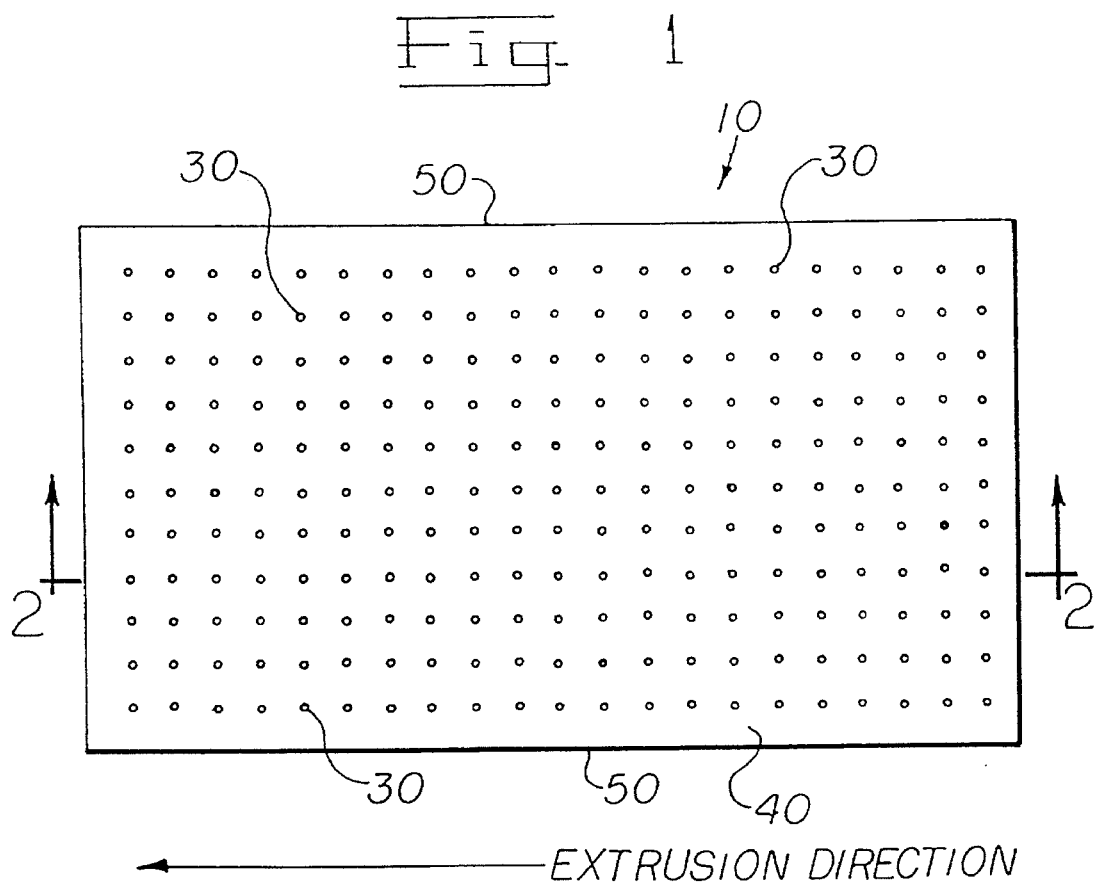
FIG. 1 shows a foam structure according to the present invention.
Figure 2:
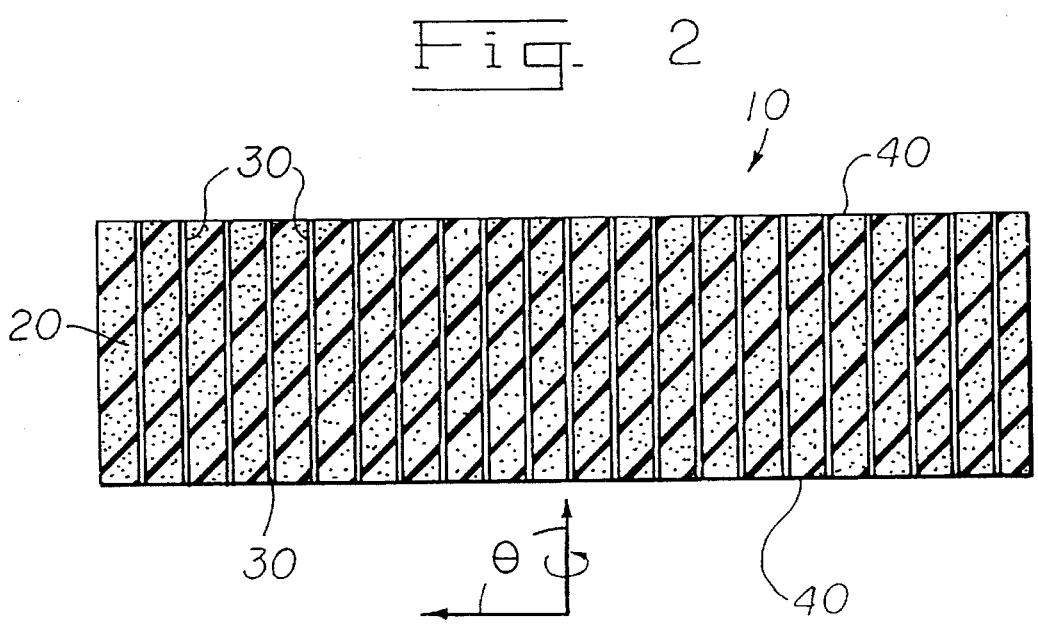
FIG. 2 shows a cross-sectional view along line 2—2 of the foam structure of FIG. 1.

A closed-cell plastic foam structure of the present invention providing enhanced release of blowing agent is seen in FIGS. 1 and 2, and is referenced generally by the reference numeral 10. Foam structure 10 comprises plastic foam 20 and a multiplicity of channels 30 extending into foam 20 from one or both of opposing surfaces 40. Structure 10 also defines opposing surfaces 50, which are generally perpendicular to surfaces 40.

Plastic materials suitable for the foams of the present foam structure include any known foamable thermoplastic or thermoset material. Suitable plastic materials may include blends of two or more thermoplastic materials, two or more thermoset materials, or thermoset and thermoplastic materials. Suitable plastic materials include polystyrene, polyolefins such as polyethylene and polypropylene, polyurethanes, and polyisocyanurates. Suitable thermoplastic materials may be homopolymers or copolymers of monoethylenically unsaturated comonomers. Useful polystyrene or known derivatives thereof include alphamethylstyrene, butylstyrene, and divinyl benzene. The present invention is particularly useful with polyethylene. Useful polyethylenes include those of high, medium, low, and ultra-low density types. Useful polyethylenes include copolymers thereof such as ethylene-acrylic acid, ethylene-vinyl acetate, and the like.

The foam of the foam structure may further contain elastomeric components such as polyisobutylene, polybutadiene, ethylene/propylene copolymers, and ethylene/propylene diene interpolymers if desired. Other possible additional components include crosslinking agents if desired. Other additional components may include nucleating agents, extrusion aids, antioxidants, colorants, pigments, etc. if desired.

The foam of the foam structure may contain one or more permeability modifiers in a quantity sufficient to prevent substantial shrinkage of the structure upon its formation from premature excessive loss of blowing agent yet allow evolution of the blowing agent from it. Suitable permeability modifiers include fatty acid amides and esters such as stearyl stearamide and glycerol monostearate.

Employing both perforation and a permeability modifier together allows both minimum shrinkage and accelerated blowing agent release to be accomplished. Together they allow blowing agent to be released at a rate slow enough in the short term to achieve the desired dimensional stability yet fast enough in the long term to achieve the desired accelerated blowing agent release. Together they are particularly useful when employing blowing agents which permeate from the foam structure faster than air counterpermeates into the foam structure. Together they are further particularly useful in collapsible foams such as those of polyethylenes, especially low density polyethylene.

The present foam structure is extruded with one or more of any blowing agents known in the art. Suitable volatile blowing agents include halocarbons such as fluorocarbons and chlorofluorocarbons; hydrohalocarbons such as hydrofluorocarbons and hydrochlorofluorocarbons; alkylhalides, such as methyl chloride and ethyl chloride; hydrocarbons such as alkanes or alkenes; and the like. Other suitable blowing agents include pristine blowing agents such as air, carbon dioxide, nitrogen, argon, water, and the like. The blowing agent may comprise a mixture of two or more of any of the above blowing agents. Other suitable blowing agents also include chemical blowing agents such as ammonium and azo type compounds. Such compounds include ammonium carbonate, ammonium bicarbonate, potassium bicarbonate, diazoaminobenzene, diazoaminotoluene, azodicarbonamide, diazoisobutyronitrile, and the like.

Preferred blowing agents are hydrocarbons, which include alkanes having from 2 to 9 carbon atoms. Preferred alkanes include butane, isobutane, pentane, isopentane, hexane, isohexane, heptane, and the like. A most preferred blowing agent is isobutane.

Though the blowing agent may be flammable or nonflammable, the present foam structure is particularly useful with flammable blowing agents because of the accelerated release of blowing agents that it provides. For purpose of this invention, a flammable blowing agent is one that has a lower explosion limit of less than about 4 percent by volume in air according to ASTM 681-85 test. Flammable blowing agents include the alkylhalides, alkanes, and alkenes described above.

The present foam structure preferably has a gross density (that is bulk density or densities of the closed-cell foam including interstitial volumes defined by the channels or any voids defined therein) preferably of about 1.6 to about 160, more preferably of about 16 to about 48 kilograms per cubic meter.

The present closed-cell foam structure preferably has at least about 70 percent of its cells by number being closed-cell exclusive of any channels or voids extending through, into, or within the structure.

Channels 30 extend from surfaces 40 into the interior of foam 20. Channels 30 provide gaseous communication between the interior of foam structure 10 and the environment outside structure 10 to facilitate accelerated release of the blowing agent. The blowing agent permeates from foam 20 into channels 30 to accelerate the rate of release of blowing agent from what the rate would be without channels 30. Channels 30 are preferably uniformly dispersed over the areas of surfaces 40. In a preferred embodiment such as in FIGS. 1 and 2, the channels extend through the foam from one surface of the foam to the opposite surface.

Channels 30 have an average width or diameter of preferably about 0.05 to about 5.1 millimeters and more preferably about 0.5 to about 1.5 millimeters. Channels 30 have an average spacing or distance apart at surfaces 40 of preferably of up to about 2.5 centimeters and more preferably up to about 1.3 centimeters.

The cross-sectional shape of the channels is not critical. For instance, the channels may take on a circular, oval, square, rectangular, or other polygonal cross-sectional shape. Typically however, such shape will take a generally circular form for purposes of convenience. The passageways through the foam defined by the channels are preferably straight and linear, but may be nonlinear, i.e., curvilinear or the like.

The prior art relates foam structures of coalesced foam strands having channels directional with the longitudinal extension formed by extrusion from a multiorifice die as seen in U.S. Pat. Nos. 3,573,152 and 4,824,720. The present foam structure distinguishes from the prior art structures by having channels free of direction or not directional with respect to the longitudinal extension or extrusion direction of foam structure. Channels 30 of the present structure 10 may be angled toward but not directional with the longitudinal extension. Channels 30 are preferably situated by between about 30 and about 90 degrees with respect to the longitudinal extension of foam structure 10 and more preferably generally perpendicularly to the longitudinal extension of foam structure 10. Reference to the angle of channels 30 is shown in FIG. 2 as angle θ for channels angled toward the extrusion direction, the reverse extrusion direction, or any direction in between. Both the extrusion direction and the reverse thereof correspond to the longitudinal extension of the structure. Alternatively or additionally, channels (not shown) may extend from surfaces 50 into foam 20 to assist in removal of the blowing agent. As for channels 30 extending into foam 20 from surfaces 40, channels (not shown) extending from surfaces 50 into foam 20 may be angled in corresponding fashion toward but not directional with the longitudinal extension, may be angled toward any direction between the extrusion direction and the reverse extrusion direction, or may extend generally perpendicularly therein with respect to the longitudinal extension. To further assist in the removal of the blowing agent, the foam structure may have additional channels (not shown) directional with the longitudinal extension as seen in U.S. Pat. Nos. 3,573,152 and 4,824,720, supra, both of which are incorporated herein by reference.

There is a process or method according to the present invention for making plastic foam structure 10 providing accelerated release of blowing agent. The process comprises providing plastic foam 20 and subsequently perforating foam 20 at its surface or surfaces 40 to form channels 30 within foam 20 free of direction with respect to the longitudinal extension of foam 20.

Providing the plastic foam comprises blending of various components, including a resinous melt of a foamable polymer and a blowing agent, under pressure to form a foamable plastic gel and extruding the foamable gel through a conventional die (not shown) to a region of lower pressure to form the foam. The blending of various components of the foamable gel may be accomplished according to known techniques in the art, Suitably a mixer, extruder, or other suitable blending device (not shown) may be employed to obtain homogeneous gel. The molten foamable gel is then be passed through conventional dies to form the foam.

It follows that means for producing foam structures other than extrusion may be employed such as bead molding and the like.

Perforating the foam comprises puncturing the foam with a multiplicity of pointed, sharp objects in the nature of a needle, pin, spike, nail, or the like. Foam 20 may be perforated by contacting or puncturing surfaces 40 with nails 62 of rack 60 shown in FIG. 3 partly through foam 20, or, more preferably, completely through the foam as seen in FIG. 2. A mat or bed of nails (not shown) or other device equivalent to rack 60 may be contemplated. It will be obvious that perforating means other than sharp, pointed objects may be employed such as drilling, laser cutting, high-pressure fluid cutting, air guns, projectiles, or the like.

To further assist in accelerating the release of blowing agent from the present foam structure, the structure may be exposed to elevated temperatures in excess of ambient levels (about 22° C.) for a period of time. Desirable exposure temperatures range from greater than ambient to the temperature below which foam instability will take place. Desirable exposure temperatures may vary due to factors including the properties of the foamed plastic material comprising the structure, the physical dimensions of the structure itself, and the blowing agent employed. The elevated temperature is maintained for a period of time preferably sufficient, in conjunction with the perforations in the present structure, to reduce the blowing agent content in the structure to a safe level before it is provided to an end user. The structure might be exposed to elevated temperatures by any suitable means such as an oven, a heating unit or element, or a warehouse having an elevated temperature environment therein.

To further illustrate the present invention, the following nonlimiting example is provided.

EXAMPLE

Perforated polyethylene foam structures of the present invention were prepared and tested for blowing agent retention as a function of time, temperature, and formulation. The blowing agent retention of the perforated foams was further compared with such retention in solid, non-perforated structures not of the present invention.

Foam structures of 5.1 cm×25.4 cm cross-section were prepared by extrusion of the foamable gel formulations represented in Table 1. The components of the gel formulations were blended in a 8.8 cm extruder and extruded through a 9.5 cm×0.3 cm dimension die orifice at a rate of 180 kg/hr and a foaming pressure at the die of 2360 kilopascals. The extruder operated in zones 1–6 at temperatures of 80° C., 140° C., 190° C., 200° C., 225° C., and 225° C., respectively. The foaming pressure and temperature at the die were 2360 kilopascals and 112° C., respectively.

TABLE 1

Foam Structure Formulations
(All proportions are parts by weight unless otherwise indicated.)

|  | Formulation #1 | Formulation #2 | Formulation #3 |
| --- | --- | --- | --- |
| Polyethylene | 100 | 100 | 100 |
| Permeation Modifier | 1.0 (SS) | 0.2 (GMS) | 0.35 (GMS) |
| Blowing Agent | 11.2 (HCFC-142b) | 6.7 (isobutane) | 6.7 (isobutane) |
| Nucleator[a] | 0.16 | 0.25 | 0.31 |
| Stabilizer[b] | 0.03 | 0.03 | 0.03 |
| Foam Density (kg/m³) | 38 | 38 | 38 |

[a]Hyrocerol CF-20 by Boeringer Ingelhiem
[b]Irganox 1010 by Ciba Geigy
HCFC-142b = 1,1,1 difluorochloroethane
SS = Stearyl stearamide
GMS = Glycerol monostearate The foam structures were cut into 2.4 meter lengths, and perforated with 3 mm diameter spikes or nails to form channels generally circular in cross-section extending therethrough between the two large surfaces. The channels were in a square configuration every 1.3 cm or 2.5 cm similar to those seen in FIG. 1. Though the structure was perforated with 3 mm spikes, the channels formed upon insertion and withdrawal of the spikes were about 1 millimeter in diameter due to the resiliency or recovery of the foam of the foam structure upon withdrawal.

A 28 cm segment was removed along the longitudinal extension of the foam structure at each time interval of measurement or age, and the sample taken from the middle of the structure to ascertain blowing agent content. Blowing agent content was measured by gas chromatography. The blowing agent content of the non-perforated foam structures not of the present invention was ascertained in substantially the same manner.

TABLE 2

Blowing Agent Retention for Foam Structures of Formulation 1

|  | 21° C.[a] | | 46° C.[a] | |
| --- | --- | --- | --- | --- |
| Foam Structure | Age (Hours) | Wt % 142b | Age (Hours) | Wt % 142b |
| Solid* | 1 | 8.45 | 1 | — |
|  | 18 | 8.40 | 18 | 8.29 |
|  | 168 | 7.54 | 168 | 5.95 |
|  | 336 | 6.38 | 336 | 4.20 |
|  | 504 | 6.46 | 504 | 3.83 |
|  | 840 | 5.99 | 840 | 2.69 |
| 2.5 cm × 2.5 cm spacing | 1 | 8.64 | — | — |
|  | 20 | 7.43 | 20 | 7.46 |
|  | 44 | 7.12 | 44 | 5.75 |
|  | 96 | 6.87 | 96 | 4.61 |
|  | 144 | 6.79 | 144 | 3.56 |
|  | 192 | 5.92 | 288 | 1.80 |
|  | 188 | 5.14 | 384 | 1.03 |
|  | 384 | 4.50 |  |  |
| 1.3 cm × 1.3 cm spacing | 1 | 8.06 | 1 | — |
|  | 20 | 6.66 | 20 | 4.25 |
|  | 44 | 5.28 | 44 | 2.92 |
|  | 96 | 4.19 | 96 | 0.71 |
|  | 144 | 3.66 | 144 | 0.18 |
|  | 192 | 3.16 | 288 | 0 |
|  | 384 | 1.40 | 384 | 0 |

*Not an example of the present invention
[a]Temperature of aging

TABLE 3

Blowing Agent Retention for Foam Structures of Formulation 2

|  | 21° C.[a] | | 46° C.[a] | |
| --- | --- | --- | --- | --- |
| Foam Structure | Age (Hours) | Wt % iC4 | Age (Hours) | Wt % iC4 |
| Solid* | 1 | 5.16 | 1 | — |
|  | 40 | 5.06 | 15 | 4.55 |
|  | 168 | 4.64 | 168 | 2.02 |
|  | 336 | 4.39 | 336 | 0.89 |
|  | 504 | 3.56 | 504 | 0.44 |
| 2.5 cm × 2.5 cm spacing | 1 | 5.30 | 1 | — |
|  | 21 | 4.54 | 17 | 3.69 |
|  | 40 | 4.49 | 41 | 2.52 |
|  | 96 | 3.31 | 96 | 0.85 |
|  | 144 | 3.25 | 192 | 0.27 |
|  | 192 | 3.10 | 228 | 0 |
|  | 188 | 2.05 | 360 | 0 |
|  | 336 | 1.72 |  |  |
| 1.3 cm × 1.3 cm spacing | 1 | 4.62 | 1 | — |
|  | 20 | 3.37 | 15 | 1.42 |
|  | 41 | 2.51 | 40 | 0.29 |
|  | 96 | 1.26 | 96 | 0 |
|  | 144 | 0.77 | 192 | 0 |
|  | 192 | 0.54 |  |  |
|  | 288 | 0.24 |  |  |
|  | 336 | 0.16 |  |  |

*Not an example of the present invention
[a]Temperature of aging

TABLE 4

Blowing Agent Retention for Foam Structures of Formulation 1

| Foam Structure | 21° C.[a] | | 46° C.[a] | |
|---|---|---|---|---|
| | Age (Hours) | Wt % iC4 | Age (Hours) | Wt % iC4 |
| Solid* | 1 | 5.06 | 1 | — |
| | 17 | 5.16 | 20 | 4.88 |
| | 168 | 4.97 | 336 | 3.35 |
| | 336 | 4.22 | 504 | 2.32 |
| 2.5 cm × 2.5 cm spacing | 1 | 5.15 | 1 | — |
| | 35 | 5.03 | 21 | 4.79 |
| | 96 | 4.51 | 37 | 3.39 |
| | 144 | 4.32 | 96 | 2.69 |
| | 336 | 3.60 | 192 | 1.59 |
| | | | 228 | 0.77 |
| | | | 360 | 0.41 |
| 1.3 cm × 1.3 cm spacing | 1 | 4.74 | 1 | — |
| | 17 | 3.95 | 14 | 3.49 |
| | 35 | 3.61 | 36 | 1.85 |
| | 96 | 2.87 | 96 | 0.66 |
| | 144 | 2.55 | 192 | 0.09 |
| | 192 | 2.19 | 288 | 0 |
| | 288 | 1.82 | 360 | 0 |
| | 336 | 1.38 | | |

*Not an example of the present invention
[a]Temperature of aging

As seen in Tables 2–4, the blowing agent content of the foam structures corresponding to Formulations 1, 2, and 3 was substantially lower as a trend than that of corresponding non-perforated structures for a given age, temperature of aging, or perforation (channel) spacing. As seen in Tables 2–4, the foam structures corresponding to Formulations 1, 2, and 3 demonstrated substantially faster blowing agent release over time than that of corresponding non-perforated structures for a given temperature of aging or perforation spacing. Further, the foam structures having 1.25 cm spacing demonstrated substantially faster blowing agent release over time than those having 2.5 cm spacing for a given age or temperature of aging. Further, the foam structures aged at 46° C. demonstrated substantially faster blowing agent release over time than those aged at 21° C. for a given age or perforation spacing.

While embodiments of the foam structure and the process for making have been shown with regard to specific details, it will be appreciated that depending upon the manufacturing process and the manufacturer's desires, the present invention may be modified by various changes by still being fairly within the scope of the novel teachings and principles herein set forth.

What is claimed is:

1. A method for providing accelerated release of a blowing agent from a solid, non-perforated polyethylene foam, comprising:

a) providing the solid, non-perforated polyethylene foam having the blowing agent and a permeability modifier therein;

b) perforating the solid, non-perforated polyethylene foam at a surface to form a multiplicity of channels extending from the surface therein free of direction with respect to the longitudinal extension of the non-perforated foam.

2. The method of claim 1, wherein the channels have an average spacing of up to about 2.5 centimeters, the non-perforated foam being a low density polyethylene foam.

3. The method of claim 2, wherein the non-perforated foam has a density of about 16 to about 48 kilograms per cubic meter, the channels being generally perpendicular to the longitudinal extension of the non-perforated foam, the channels having an average spacing of up to about 1.3 centimeters, the permeability modifier being selected from the group consisting of fatty acid esters and fatty acid amides.

4. The method of claim 3, wherein the channels are dispersed over substantially the entire surface.

5. The method of claim 4, wherein the blowing agent has a lower explosion limit of less than about 4 percent by volume in air.

6. The method of claim 5, wherein the blowing agent comprises an alkane having from 3 to 9 carbon atoms.

7. The method of claim 6, wherein the 3 to 9 carbon alkane comprises isobutane.

8. The method of claim 2, wherein the blowing agent comprises isobutane.

9. The method of claim 2, wherein the channels are dispersed over substantially the entire surface.

10. The method of claim 7, wherein the permeability modifier is selected from the group consisting of glycerol monostearate and stearyl stearamide.

11. The method of claim 9, wherein the permeability modifier is selected from the group consisting of glycerol monostearate and stearyl stearamide.

12. The method of claim 9, wherein the permeability modifier is selected from the group consisting of glycerol monostearate and stearyl stearamide.

13. The method of claim 9, wherein the non-perforated foam is perforated at the surface to form channels partly therethrough.

14. The method of claim 7, wherein the non-perforated foam is perforated at the surface to form channels partly therethrough.

15. The method of claim 7, wherein the non-perforated foam is perforated to form channels extending therethrough from the surface to an opposite surface.

16. The method of claim 9, wherein the non-perforated foam is perforated to form channels extending therethrough from the surface to an opposite surface.

17. The method of claim 4, wherein the non-perforated foam is perforated to form channels partly therethrough.

18. The method of claim 3, wherein the non-perforated foam provided has a dimension in cross-section of about 5.1 centimeters.

19. The method of claim 3, wherein the non-perforated foam provided has a dimension in cross-section of 5.1 centimeters.

20. The method of claim 4, wherein the non-perforated foam provided has a dimension in cross-section of about 5.1 centimeters.

21. The method of claim 4, wherein the non-perforated foam provided has a dimension in cross-section of 5.1 centimeters.

22. The method of claim 1, wherein the permeability modifier is selected from the group consisting of fatty acid amides and fatty acid esters.

23. The method of claim 1, wherein the permeability modifier is selected from the group consisting of glycerol monostearate and stearyl stearamide.

24. A method for providing accelerated release of a blowing agent from an extruded, solid, non-perforated low density polyethylene foam, comprising:

a) providing the solid, non-perforated low density polyethylene foam with the blowing agent and a permeability modifier therein; and b) perforating the solid, non-perforated low density polyethylene foam at a surface to form a multiplicity of channels extending from the surface therein at between about 30 and about 90 degrees with respect to the longitudinal extension of the non-perforated foam.

25. The method of claim 24, wherein the channels have an average spacing of up to about 2.5 centimeters.

26. The method of claim 25, wherein the non-perforated foam has a density of about 16 to about 48 kilograms per cubic meter, the channels having an average spacing of up to about 1.3 centimeters.

27. The method of claim 26, wherein the permeability modifier is selected from the group consisting of fatty acid amides and fatty acid esters.

28. The method of claim 27, wherein the channels being generally perpendicular to the longitudinal extension of the non-perforated foam.

29. The method of claim 28, wherein the channels are dispersed over substantially the entire surface.

30. The method of claim 28, wherein the blowing agent comprises isobutane.

31. The method of claim 25, wherein the channels are dispersed over substantially the entire surface.

32. The method of claim 28, wherein the blowing agent comprises a 3 to 9 carbon alkane.

33. The method of claim 1, wherein the non-perforated foam is perforated in a uniform dispersion over the area of the surface.

34. The method of claim 3, wherein the non-perforated foam is perforated in a uniform dispersion over the area of the surface.

35. The method of claim 4, wherein the non-perforated foam is perforated in a uniform dispersion over the area of the surface.

36. The method of claim 18, wherein the non-perforated foam is perforated in a uniform dispersion over the area of the surface.

37. The method of claim 19, wherein the non-perforated foam is perforated in a uniform dispersion over the area of the surface.

38. The method of claim 20, wherein the non-perforated foam is perforated in a uniform dispersion over the area of the surface.

39. The method of claim 21, wherein the non-perforated foam is perforated in a uniform dispersion over the area of the surface.

40. The method of claim 24, wherein the non-perforated foam is perforated in a uniform dispersion over the area of the surface.

41. The method of claim 28, wherein the non-perforated foam is perforated in a uniform dispersion over the area of the surface.

42. The method of claim 29, wherein the non-perforated foam is perforated in a uniform dispersion over the area of the surface.

43. The method of claim 31, wherein the non-perforated foam is perforated in a uniform dispersion over the area of the surface.

44. A method, the method comprising:
a) providing a solid, non-perforated polyethylene foam with a blowing agent and a permeability modifier therein; and
b) perforating the solid, non-perforated polyethylene foam to form a multiplicity of channels dispersed over substantially the entire surface and extending from the surface therein free of direction with respect to the longitudinal extension of the non-perforated foam.

45. The method of claim 44, wherein the channels have an average spacing of up to about 2.5 centimeters, the non-perforated foam being a low density polyethylene foam selected from the group consisting of fatty acid esters and fatty acid amides.

46. The method of claim 45, wherein the non-perforated foam has a density of about 16 to about 48 kilograms per cubic meter, the channels being generally perpendicular to the longitudinal extension of the non-perforated foam, the channels having an average spacing of up to about 1.3 centimeters, the permeability modifier being selected from the group consisting of fatty acid esters and fatty acid amides.

47. The method of claim 46, wherein the non-perforated foam is perforated in a uniform dispersion over the area of the surface.

48. The method of claim 46, wherein the blowing agent comprises an alkane having from 3 to 9 carbon atoms.

49. The method of claim 47, wherein the blowing agent comprises an alkane having from 3 to 9 carbon atoms.

50. The method of claim 48, wherein the non-perforated foam is perforated at the surface to form channels partly therethrough.

51. The method of claim 49, wherein the non-perforated foam is perforated at the surface to form channels partly therethrough.

52. The method of claim 48, wherein the non-perforated foam is perforated to form channels extending therethrough from the surface to an opposite surface.

53. The method of claim 49, wherein the non-perforated foam is perforated to form channels extending therethrough from the surface to an opposite surface.

54. The method of claim 50, wherein the permeability modifier is selected from the group consisting of glycerol monostearate and stearyl stearamide.

55. The method of claim 51, wherein the permeability modifier is selected from the group consisting of glycerol monostearate and stearyl stearamide.

56. The method of claim 52, wherein the permeability modifier is selected from the group consisting of glycerol monostearate and stearyl stearamide.

57. The method of claim 53, wherein the permeability modifier is selected from the group consisting of glycerol monostearate and stearyl stearamide.

58. The method of claim 54, wherein the non-perforated foam provided has a dimension in cross-section of about 5.1 centimeters.

59. The method of claim 55, wherein the non-perforated foam provided has a dimension in cross-section of about 5.1 centimeters.

60. The method of claim 56, wherein the non-perforated foam provided has a dimension in cross-section of about 5.1 centimeters.

61. The method of claim 57, wherein the non-perforated foam provided has a dimension in cross-section of about 5.1 centimeters.

62. The method of claim 54, wherein the non-perforated foam provided has a dimension in cross-section of 5.1 centimeters.

63. The method of claim 55, wherein the non-perforated foam provided has a dimension in cross-section of 5.1 centimeters.

64. The method of claim 56, wherein the non-perforated foam provided has a dimension in cross-section of 5.1 centimeters.

65. The method of claim 57, wherein the non-perforated foam provided has a dimension in cross-section of 5.1 centimeters.

* * * * *